(12) United States Patent
Adams et al.

(10) Patent No.: US 7,394,457 B2
(45) Date of Patent: Jul. 1, 2008

(54) DEVICE BEHAVIOR BASED ON SURROUNDING DEVICES

(75) Inventors: Aditha M. Adams, Seattle, WA (US); Adrian Mark Chandley, Sammamish, WA (US); Carl J. Ledbetter, Mercer Island, WA (US); Dale Clark Croiser, Kirkland, WA (US); Justin Michael Maguire, Seattle, WA (US); Pasquale DeMaio, Bellevue, WA (US); Taryn K. Beck, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 703 days.

(21) Appl. No.: 10/831,069

(22) Filed: Apr. 23, 2004

(65) Prior Publication Data

US 2005/0237270 A1    Oct. 27, 2005

(51) Int. Cl.
    *G06F 3/02* (2006.01)
(52) U.S. Cl. ......................................... 345/169; 345/156
(58) Field of Classification Search .......... 345/156–169
    See application file for complete search history.

(56) References Cited

U.S. PATENT DOCUMENTS

| | | | |
|---|---|---|---|
| 3,627,231 A | 12/1971 | Kalthoff | 243/16 |
| 3,709,378 A | 1/1973 | Segal | 214/1 |
| 3,919,701 A | 11/1975 | Chang et al. | 340/174 |
| 4,940,348 A | 7/1990 | Akers et al. | 400/624 |
| 6,710,346 B2 | 3/2004 | Brewington et al. | 250/341.8 |
| 2003/0025082 A1 | 2/2003 | Brewington et al. | 250/341.8 |

OTHER PUBLICATIONS

Bratland, T. et al., "Why a Magnetic Sensor?", *Sensors Expo Proceedings*, Apr. 16-18, 1996, 261-265.
Heide, P. "Commercial Microwave Sensor Technology: An Emerging Business", *Microwave Journal*, May 1999, 348-352.
Horton, T., "Fundamentals of Solid-State Presence Sensing Technologies", *Sensors Expo*, May 16-18, 1995, 139-189.
Henry M. Morris, "Presence, Identity, and Position Keeps Manufacturing On Line", *Control Engineering*, Nov. 1990, 37(13), 69-71.
"Presence Sensing New Roles for Noncontent Sensors", *Production Engineering*, Nov. 1978, 25(11), 57-61.
U.S. Appl. No. 10/743,312, filed Dec. 23, 2003.

*Primary Examiner*—Richard Hjerpe
*Assistant Examiner*—Jean Lesperance
(74) *Attorney, Agent, or Firm*—Woodcock Washburn LLP (57) ABSTRACT

A method for modifying the operation of a device responsive to the detection of a remote device is provided. In the method, the remote device is detected, and communications with the remote device are established responsive to the detection of the remote device. A determination is made as to whether a feature of the device is affected by the establishment of communications with the remote device, and an action with respect to the feature of the device is initiated.

35 Claims, 9 Drawing Sheets

DEVICE BEHAVIOR BASED ON SURROUNDING DEVICES

COPYRIGHT NOTICE AND PERMISSION

A portion of the disclosure of this patent document may contain material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice shall apply to this document: Copyright © 2004, Microsoft Corp.

FIELD OF THE INVENTION

The present invention relates generally to electronic device behavior. More specifically, the present invention relates to the modification and usage of a device's available functionality based on one or more surrounding devices.

BACKGROUND OF THE INVENTION

Electronic devices are more frequently being operated as mobile devices, rather than being fixed to a single location. Cellular telephones, Personal Digital Assistants (PDAs), laptop computers, and the like, are all examples of devices that may be operated while their user is moving from place to place. While such devices may be well-adapted for running their own mobile applications, such devices are often ill-suited for interacting with other devices. For example, conventional notebook computers operating in a wireless environment can tell when another computer is within a communications range, but the only information provided to a user of such a computer is a notification that the other computer is available. If the user wishes to interact with the other computer, the user must typically make selections from a list of features. The list of features is usually the default listing, as would ordinarily be presented to the user whether another computer was within a communications range or not. Thus, the user must navigate through what is potentially a series of features that are unrelated to operations that may be desired based on the presence of the other computer.

As another example, a computer may be able to communicate with a digital camera for downloading digital pictures from the camera to the computer. Conventionally, if the camera is brought into the same room as the computer, a wireless communications link may be established between the two devices. However, and significantly, neither device will modify its behavior with respect to the other device. For example, if the user wishes to direct the computer to receive digital pictures from the camera, the user must operate the computer using a user interface that has not been modified to reflect the fact that the computer is currently able to communicate with the camera. As a result, the user may have to navigate through various unrelated screens, menus and so forth before being able to initiate the transfer of pictures.

Another shortcoming of conventional systems and methods for controlling devices is that a device typically only displays its own settings and features to a user, even when the device is able to communicate with another device. In the computer and camera example above, a user of the computer is only presented with features or options that are made available by the computer, rather than with features of both devices or with information regarding the system formed by the computer and the camera.

Yet another shortcoming of conventional systems and methods for controlling devices is that such systems and methods are unable to move the performance of features from one device to another. For example, if two laptop computers are placed in the same room, the computers will not divide the workload of presenting images, computational processing, etc., because neither computer has modified its behavior to enable such operations. In other words, neither conventional computer is able to "predict" how each will be used while operating in the presence of the other device.

Accordingly, what is needed is a method for modifying the behavior of an electronic device responsive to the detection of a remote device. More particularly, what is needed is a method for taking an action with respect to a feature that is affected by the presence of the remote computer. Even more particularly, what is needed is a method for enabling a device to effectively "predict" how it will be used by a user because of the features that are affected by being in operative communications with the remote device.

SUMMARY OF THE INVENTION

In light of the foregoing limitations and drawbacks, a method for modifying the operation of a device responsive to the detection of a remote device is provided. In the method, the remote device is detected, and communications with the remote device are established responsive to the detection of the remote device. A determination is made as to whether a feature of the device is affected by the establishment of communications with the remote device, and an action with respect to the feature of the device is initiated.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary embodiments of the invention; however, the invention is not limited to the specific methods and instrumentalities disclosed. In the drawings.

DETAILED DESCRIPTION OF ILLUSTRATIVE EMBODIMENTS

The subject matter of the present invention is described with specificity to meet statutory requirements. However, the description itself is not intended to limit the scope of this patent. Rather, the inventors have contemplated that the claimed subject matter might also be embodied in other ways, to include different steps or elements similar to the ones described in this document, in conjunction with other present or future technologies. Moreover, although the term "step" may be used herein to connote different aspects of methods employed, the term should not be interpreted as implying any particular order among or between various steps herein disclosed unless and except when the order of individual steps is explicitly described.

Overview

A method for modifying the operation of a device responsive to the detection of a remote device is presented herein. As will be appreciated from the discussion to follow, an embodiment of the present invention provides a first electronic device with the ability to take an action with respect to a feature that is affected by a second, remote device. For example, in one embodiment, the first device detects the second device and establishes operative communications with the second device. The first device determines whether a feature is affected by the establishment of operative communications with the second device and, if so, takes an action with respect to the feature. It will become apparent from the discussion that follows that neither the first nor second device need be portable, although portable devices are also compatible with an embodiment of the present invention. In some embodiments, the first and second devices are stationary devices that are brought into operative communications for the first time. In other embodiments, one or both of the devices are portable.

An embodiment of the present invention enables enhanced device functionality. For example, in one embodiment a first device may determine which features are available to a user now that the second device is present. The first device may then automatically initiate one or more of the features, or may present one or more of the features to the user in an easily-viewed and/or simplified format. In such a manner, it may appear to the user that the first device is "predicting" how it will be used because it is emphasizing the features most likely to be selected by the user based on the presence of the second device. The emphasis of the affected features may, in some embodiments, be carried out by deemphasizing the features that are unaffected by the presence of the second device. In st143ill other embodiments, features of the first device may be performed by the second device, and vice-versa.

As will be seen in the discussion that follows, any number of configurations of any number of devices are possible because of the embodiment's ability to determine which features are affected by the second, and subsequent devices. Before discussing the invention in detail, we will first describe exemplary computing and network environments in which the invention may be advantageously practiced.

Exemplary Computing Environment

Figure 1:
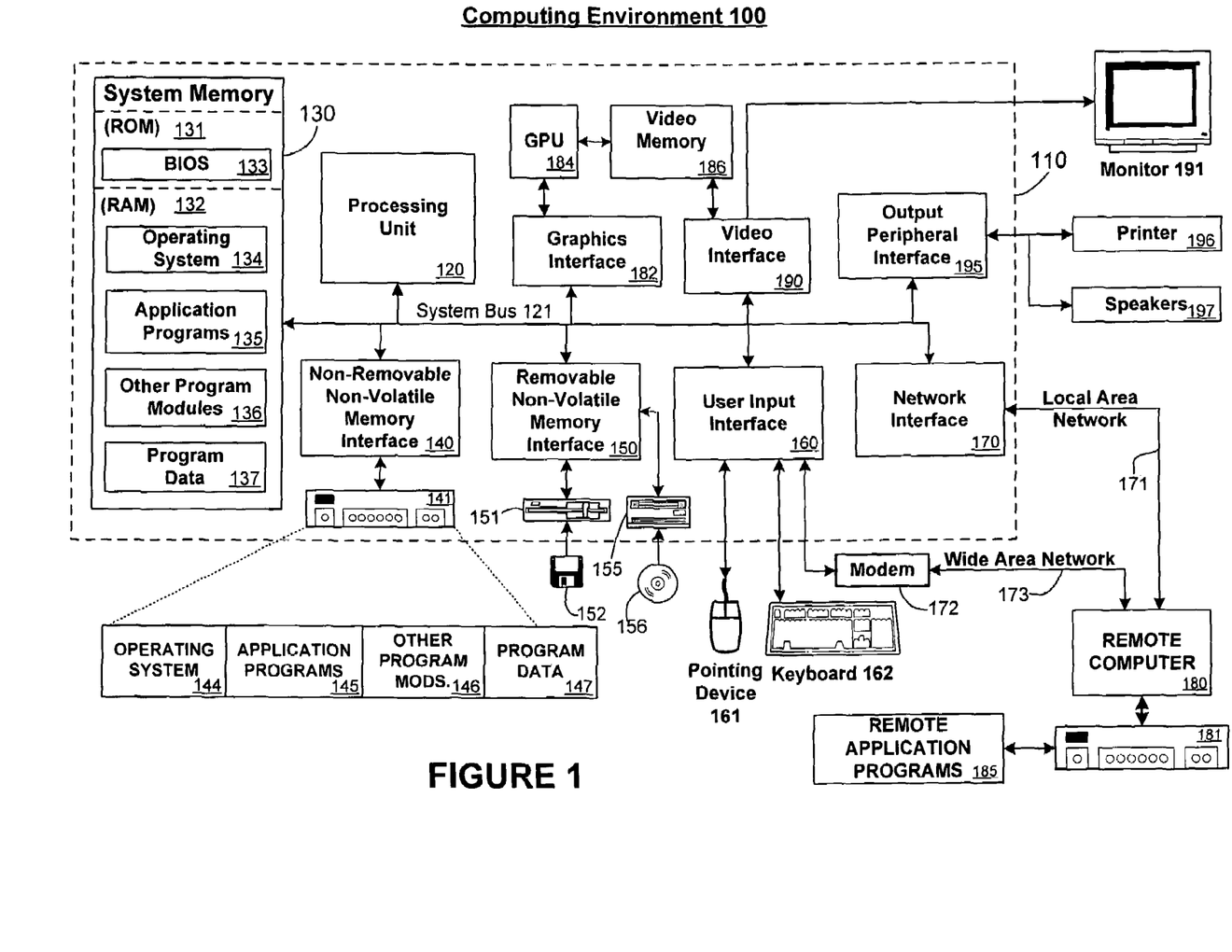
FIG. 1 is a diagram illustrating an exemplary computing environment in which aspects of the invention may be implemented.

FIG. 1 illustrates an example of a suitable computing system environment 100 in which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, storage devices such as USB drives, remote controls, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network or other data transmission medium. In a distributed computing environment, program modules and other data may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and non-volatile media, removable and non-removable media. By way of example, and not limitation, computer readable media may comprise computer storage media and communication media. Computer storage media includes both volatile and non-volatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or non-volatile memory such as ROM 131 and RAM 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/non-volatile computer storage media. By way of example only, FIG. 1 illustrates a hard disk drive 140 that reads from or writes to non-removable, non-volatile magnetic media, a magnetic disk drive 151 that reads from or writes to a removable, non-volatile magnetic disk 152, and an optical disk drive 155 that reads from or writes to a removable, non-volatile optical disk 156, such as a CD-ROM or other optical media. Other removable/non-removable, volatile/non-volatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Exemplary Distributed Computing Frameworks or Architectures

Various distributed computing frameworks have been and are being developed in light of the convergence of personal computing and the Internet. Individuals and business users alike are provided with a seamlessly interoperable and web-enabled interface for applications and computing devices, making computing activities increasingly web browser or network-oriented.

For example, MICROSOFT®'s .NET platform includes servers, building-block services, such as web-based data storage, and downloadable device software. Generally speaking, the .NET platform provides (1) the ability to make the entire range of computing devices work together and to have user information automatically updated and synchronized on all of them, (2) increased interactive capability for web sites, enabled by greater use of XML rather than HTML, (3) online services that feature customized access and delivery of products and services to the user from a central starting point for the management of various applications, such as e-mail, for example, or software, such as Office .NET, (4) centralized data storage, which will increase efficiency and ease of access to information, as well as synchronization of information among users and devices, (5) the ability to integrate various communications media, such as e-mail, faxes, and telephones, (6) for developers, the ability to create reusable modules, thereby increasing productivity and reducing the number of programming errors, and (7) many other cross-platform integration features as well.

While exemplary embodiments herein are described in connection with software residing on a computing device, one or more portions of the invention may also be implemented via an operating system, API, or middleware software between a coprocessor and requesting object, such that services may be performed by, supported in, or accessed via all of .NET's languages and services, and in other distributed computing frameworks as well.

Description of Embodiments of the Present Invention

Figure 2A:
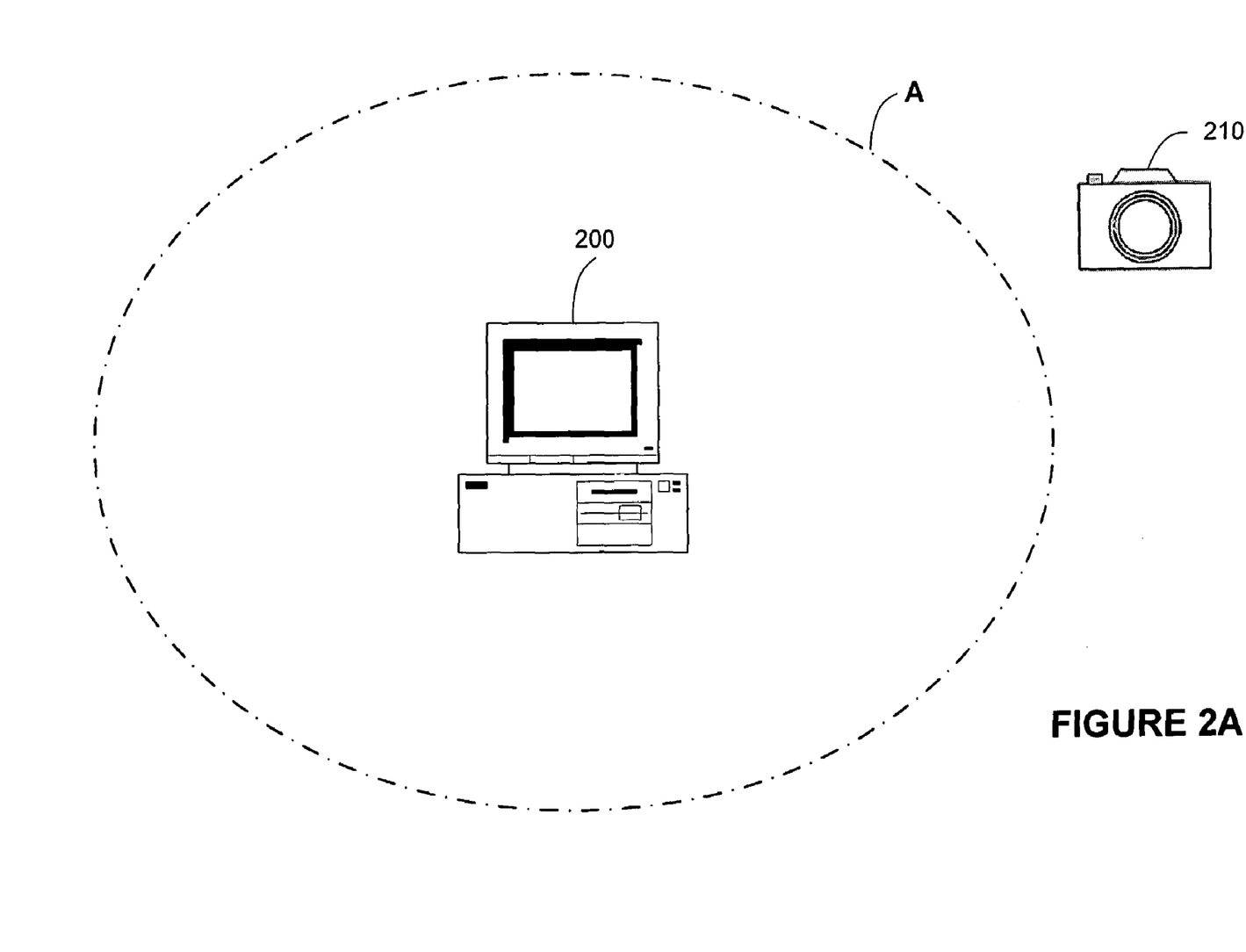
FIGS. 2A-D are diagrams representing exemplary configurations of electronic devices in which aspects of various embodiments of the present invention may be incorporated.

Now that an exemplary computing environment has been described in detail, a series of exemplary configurations of electronic devices in which aspects of various embodiments of the present invention may be incorporated is illustrated and discussed in connection with FIGS. 2A-D. Turning now to FIG. 2A, a first exemplary configuration of devices is illustrated. In FIG. 2A, a camera 210 such as, for example, a digital camera, is illustrated. Computer 200 may be any type of computing device including, but not limited to, computer 110 as discussed above in connection with FIG. 1.

Communications range A corresponds to a range within which the computer 200 is able to communicate with a remote device such as, for example, the camera 210. The communications range of the camera 210 has been omitted for clarity. Nevertheless, it will be appreciated that each device need not have a communications range. In other words, full-duplex (i.e., two-way) communications need not be enabled between all devices. For example, one device, such as the computer 200, may be able to interrogate a remote device for information, where the remote device is not able to communicate to the computer. An interrogation of a device having a Radio Frequency Identification (RFID) tag is just one example of such a scenario. Another example is infrared beacons, where a beacon could be placed in each room of a building, and would periodically pulse so any device in the room would be informed of its location.

Thus, it will be appreciated that as long as camera 210 (or any other type of electronic device) is effectively outside of the communications range A of the computer 200 (again, or any other type of electronic device), the two devices will be unable to communicates with each other directly.

Figure 2B:
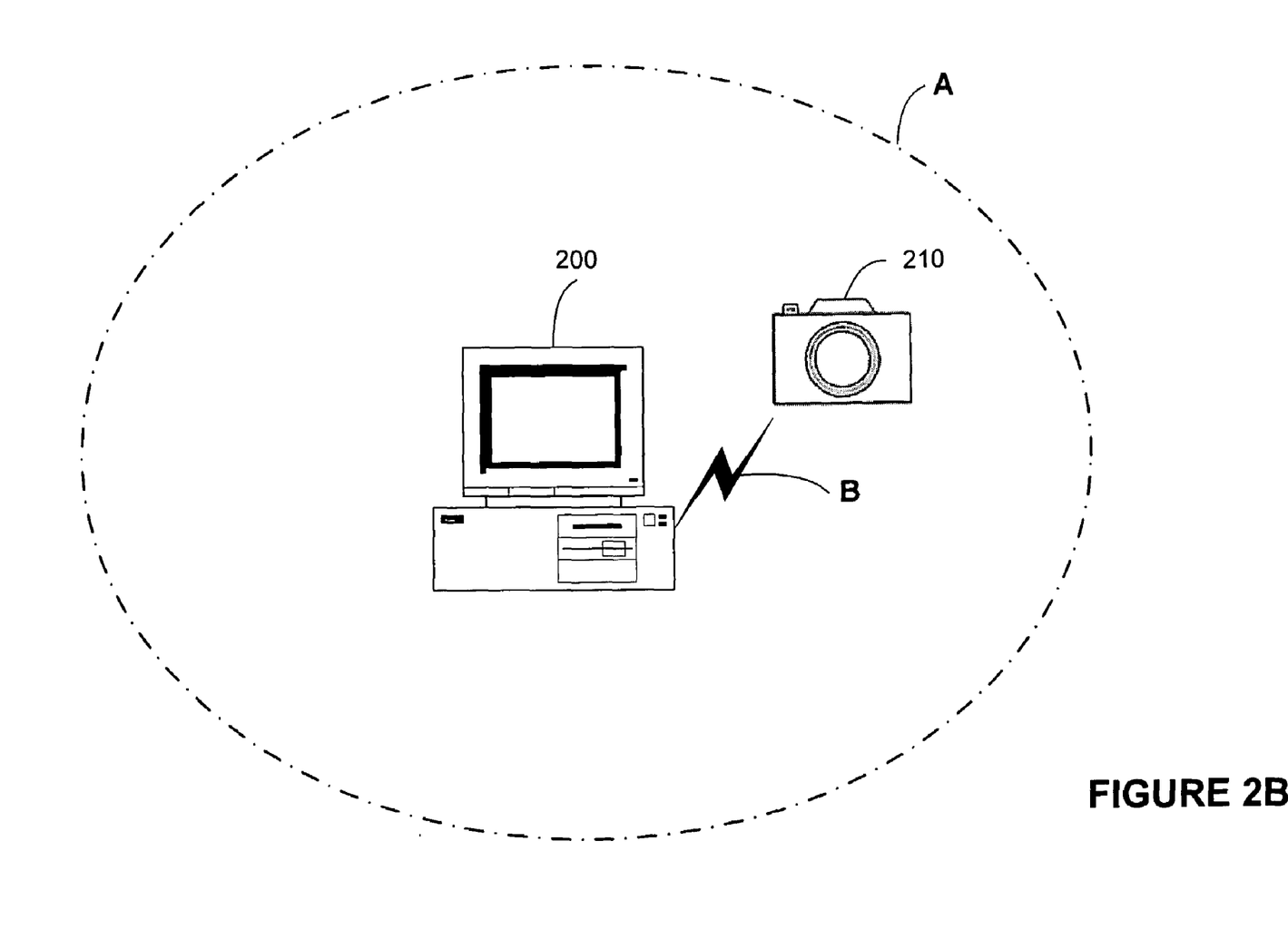

Referring now to FIG. 2B, a second exemplary configuration of devices is illustrated. In FIG. 2B, the computer 200 and camera 210 are as described above in connection with FIG. 2A. However, and unlike in FIG. 2A, the camera 210 is now within the communications range A of the computer 200. As a result, operative communications between the camera 210 and computer 200 is enabled, as represented by the communications link B. It will be appreciated that the communications link B may be established using any type of wireless communications such as, for example, IEEE 802.11—compliant protocols, Bluetooth® technology, RFID protocols and the like. Thus, once the communications link B is established, the computer 200 and camera 210 are in operative communications with each other.

Figure 2C:
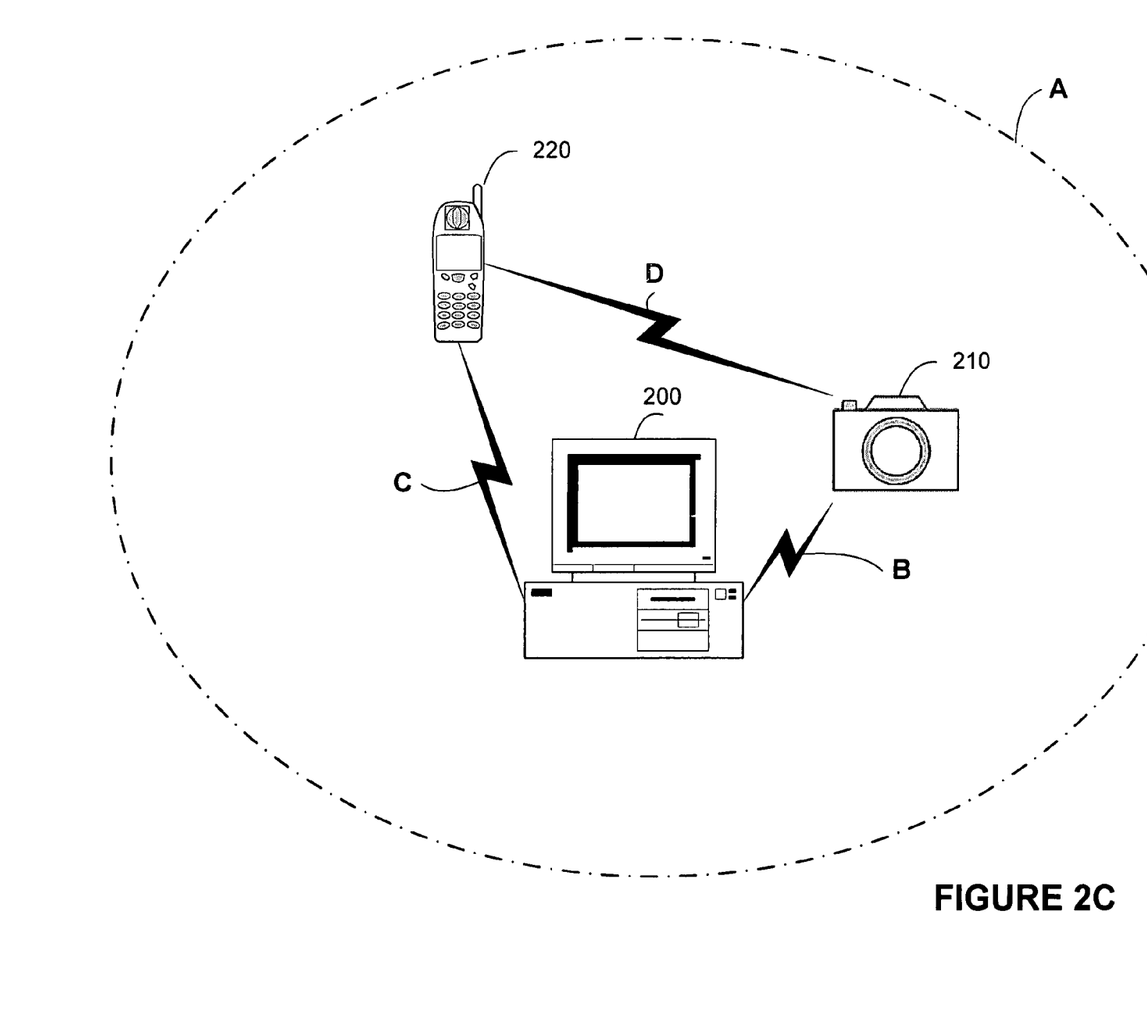

Referring now to FIG. 2C, a third exemplary configuration of devices is illustrated. In FIG. 2C, the computer 200 and camera 210 are in operative communications with each other by way of the communications link B, as was the case above in FIG. 2B. In addition, a cellular telephone 220 has been placed within the communications range A of the computer 200. The communications ranges of the cellular telephone 220 and the camera 210 are not shown in FIG. 2C for clarity. As a result of the placement of the cellular telephone 220, the telephone 220 and computer 200 can communicate by way of communications link C, and the telephone 200 and camera 210 can communicate by way of communications link D.

Figure 2D:
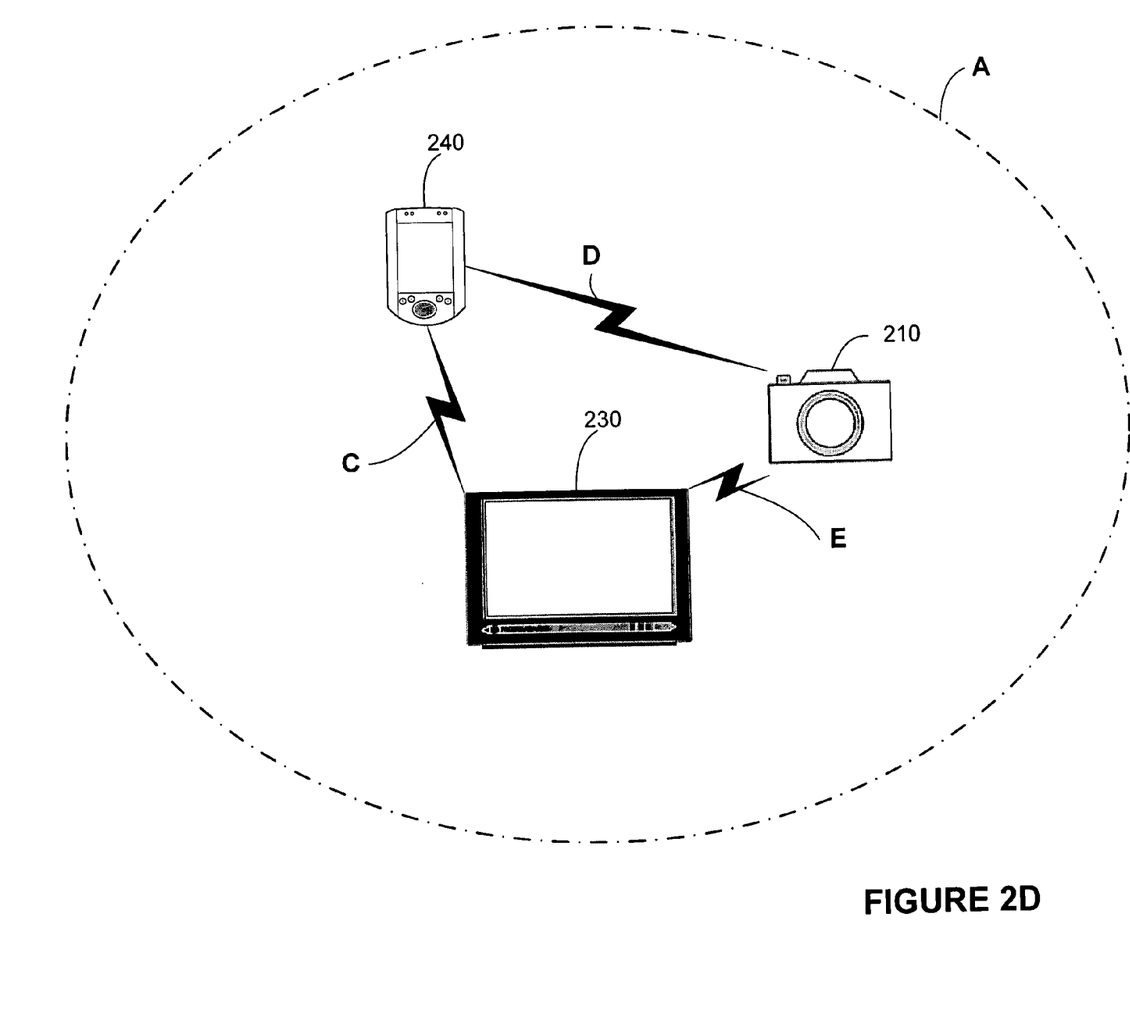

It will be appreciated that a computer such as the computer 200 shown in FIGS. 2A-C need not be present for devices such as the cellular telephone 220 and camera 210 to communicate. To illustrate, FIG. 2D shows a fourth exemplary configuration of devices. In FIG. 2D, the camera 210 is shown in operative communications with a television 230 and a personal digital assistant (PDA) 240. The PDA 240 is in operative communications with the television 230 by way of communications link C, and with the camera by way of communications link D. Likewise, the camera 210 is in operative communications with the television 230 by way of communications link E.

As noted above, FIG. 2D is intended to illustrate that a computer need not be involved to enable an embodiment of the invention. The devices that are in operative communications with each other in accordance with an embodiment of the present invention may be simple and/or specialized devices. For example, a storage device such as a USB drive (not shown in FIG. 2D for clarity) may be adapted to directly accept data from the camera 210 without the intervention of any other device such as a computer. In addition, any number of devices of any type may be in operative communications with each other according to an embodiment.

As noted above, a shortcoming of conventional systems is that such systems usually provide a user with information regarding all features of a device, without regard for any remote devices that are in operative communications with the device. According to one embodiment, therefore, the features of a device are selected and displayed to a user according to the features which are affected by a remote device with which the device is in operative communications. As a result, the features displayed are tailored to the features that may take place as a result of the presence of the remote device. In effect, a device that is operating in accordance with an embodiment of the present invention is able to predict the features the user is most likely to use, based on the features affected by the device being in operative communications with the remote device.

Figure 3A:
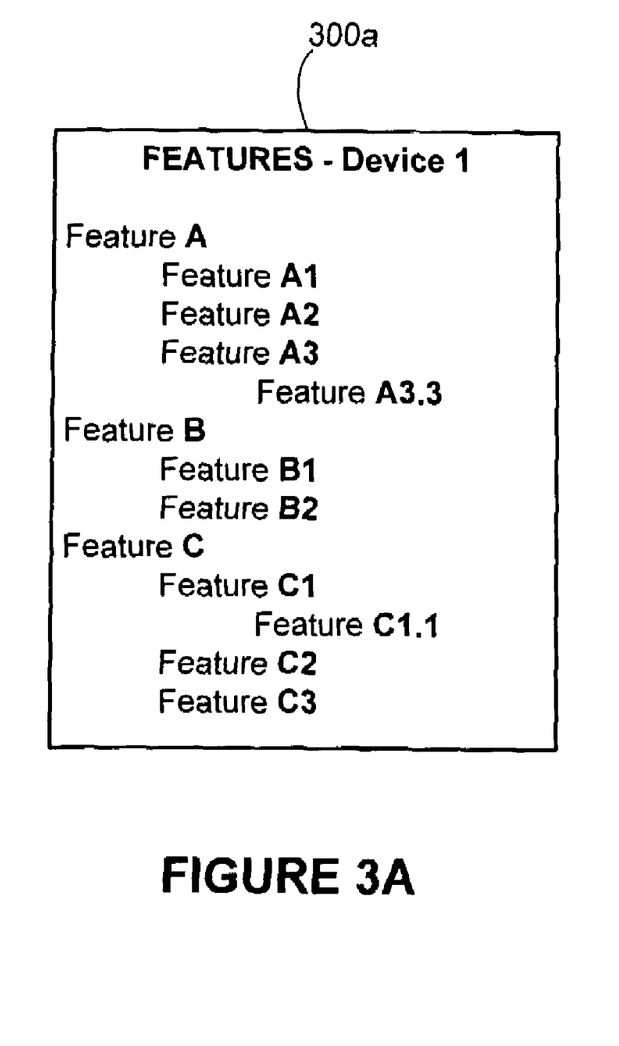
FIGS. 3A-B are diagrams illustrating exemplary device feature configurations in which aspects of various embodiments of the present invention may be incorporated.
Figure 3B:
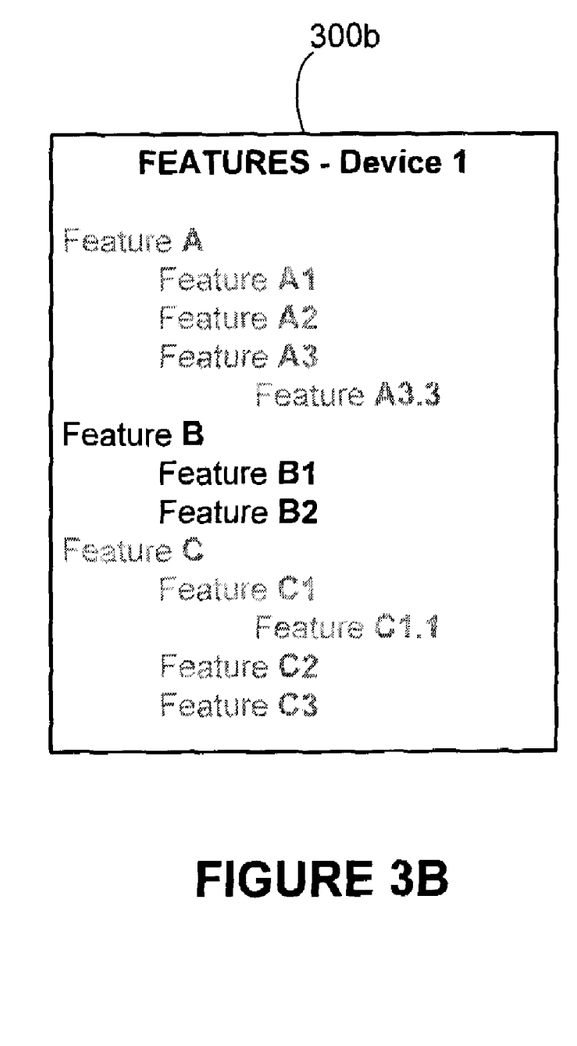

Accordingly, FIGS. 3A-B are diagrams illustrating exemplary device feature configurations. In FIG. 3A, features of an exemplary device named "device 1" are presented in a list 300*a*. The device may be, for example, any of the devices illustrated above in connection with FIGS. 1-2D, or any other type of electronic device. It will be appreciated that the list 300*a* may be presented in any manner to the user. For example, in a computer, the features may be presented in a series of pull-down menus, in one or more lists, graphically using icons, by way of audio outputs, or the like. Thus, the list 300*a* shown is merely symbolic and for illustrative purposes, as any manner of presenting features is equally consistent with an embodiment.

In FIG. 3A, therefore, features A, B and C represent features of the device. Features may be, for example, Input/Output (I/O) operations, display operations, processing operations and the like. Features A1-3, B1-2 and C1-3 represent sub-features related to features A, B and C, respectively. Likewise, features A3.3 and C1.1 represent sub-features related to features A3 and C1, respectively. A sub-feature of a feature is related to that feature and performs a task related to that feature. For example, a sub-feature of a general I/O feature may be to download an electronic file.

In the exemplary feature list 300*a* of FIG. 3A, only feature B is related to a remote device. For example, features A and C—and their associated sub-features—are related to operations of the device that do not involve a remote device. A remote device may be any device that enters into operative communications with "device 1." As an example of a feature that is not related to a remote device, if the device is a camera, such as camera 210 as discussed above in connection with FIGS. 2A-D, features A and C may be related to certain picture-taking features that a remote device cannot influence. Conversely, feature B—using the same camera example—may be related to the down- or up-loading of pictures or instructions from a remote device. Thus, when a remote device is in operative communications with the camera, feature B, as well as sub-features B1-2, may be of particular importance.

It will be appreciated that conventional systems would present the entire feature list 300*a* regardless of whether a remote device is in operative communications with "device 1" or not. Thus, a user of "device 1" would have to locate the appropriate feature (B) and/or sub-features (B1-2) from all of the available features to perform an operation with respect to the remote device. While the exemplary feature list 300*a* illustrated in FIG. 3A is relatively short in length, it will be appreciated that in some embodiments, the list 300*a* of features available on a device may be very large, thereby making the user's task of selecting an appropriate feature quite difficult and/or tedious.

Turning now to FIG. 3B, therefore, an example of a feature list provided in accordance with one embodiment of the present invention is provided. In FIG. 3B, the feature list 300b is tailored based on the presence of a remote device, wherein the remote device is in operative communications with "device 1." As can be seen in FIG. 3B, remote device-related feature B, as well as sub-features B1-2, are emphasized over features A and C (as well as over all of feature A and C's sub-features), which are unrelated to the remote device. Such emphasis may be provided in any number of ways. For example, in one embodiment, a window of information pertaining to feature B may be presented to a user upon detecting the remote device.

In another embodiment, visual cues such as, for example, bold and/or colored text or symbols may be used. In yet another embodiment, the non-remote-device-related features (A and C) may be deemphasized. For example, such features may be minimized, hidden or the like. Also, the combination of features that are emphasized or deemphasized may be the result of, for example, a default setting, automatic selection, user preference, or the like. A heuristic may be used, for example, to select the most appropriate features for emphasis, based on any number of inputs. In addition, the non-remote-device-related features may be entirely disabled and/or otherwise made unavailable to a user. In some embodiments, unaffected features may be emphasized along with affected features in a selective manner. In such embodiments, the unaffected features may be emphasized because they perform a function that is commonly used along with an affected feature. In the above example of the computer and camera, an unaffected "print" feature may be emphasized along with an affected digital picture transfer feature because users frequently choose to print pictures they have transferred to their computers. Likewise, affected features that are frequently unused may not be emphasized, or even deemphasized or disabled.

It will be appreciated that a user operating a device according to an embodiment will therefore be presented with features relating to the remote device that is in operative communications with device 1. As a result, the user does not have to navigate through unrelated features and/or menus, or the like, before initiating a remote device-related feature. As will be seen below in connection with the discussion of FIG. 5, remote device-related features (such as exemplary feature B) may, in some embodiments, be automatically activated in connection with or in place of the above-mentioned emphasizing.

Figure 4A:
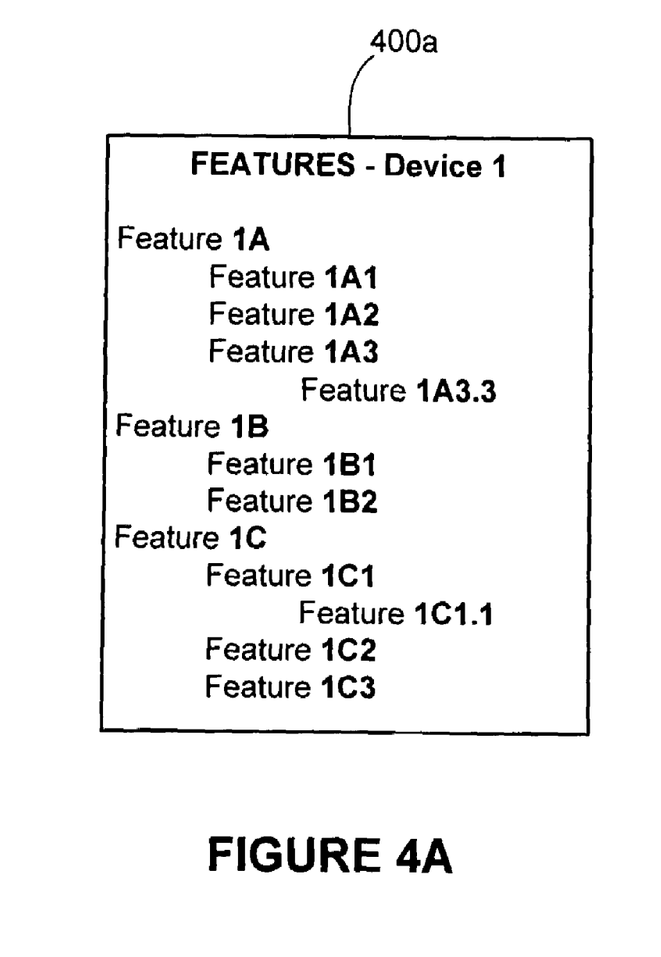
FIGS. 4A-C are diagrams illustrating exemplary device and system feature configurations in which aspects of various embodiments of the present invention may be incorporated.
Figure 4B:
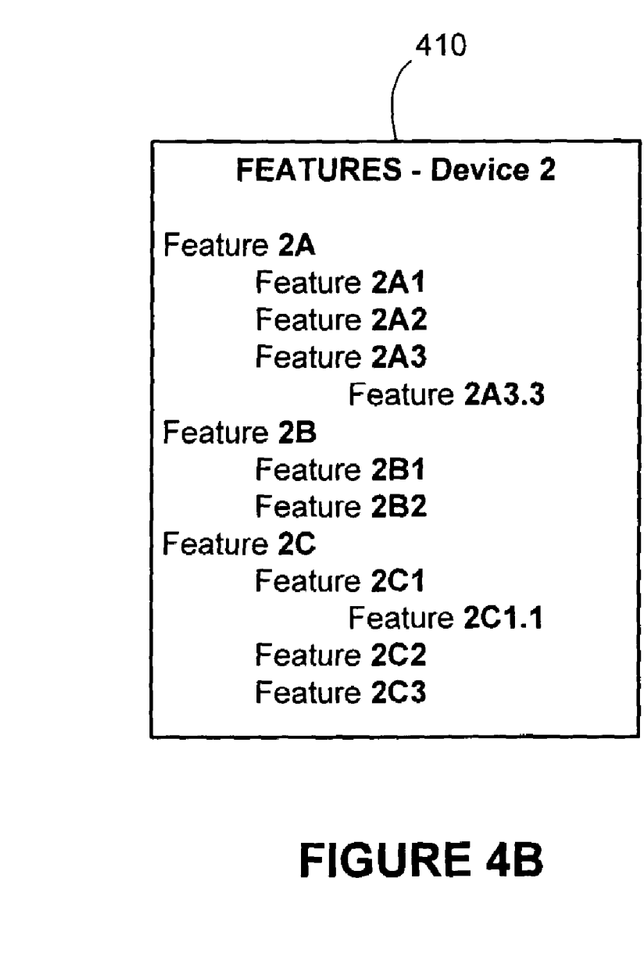
Figure 4C:
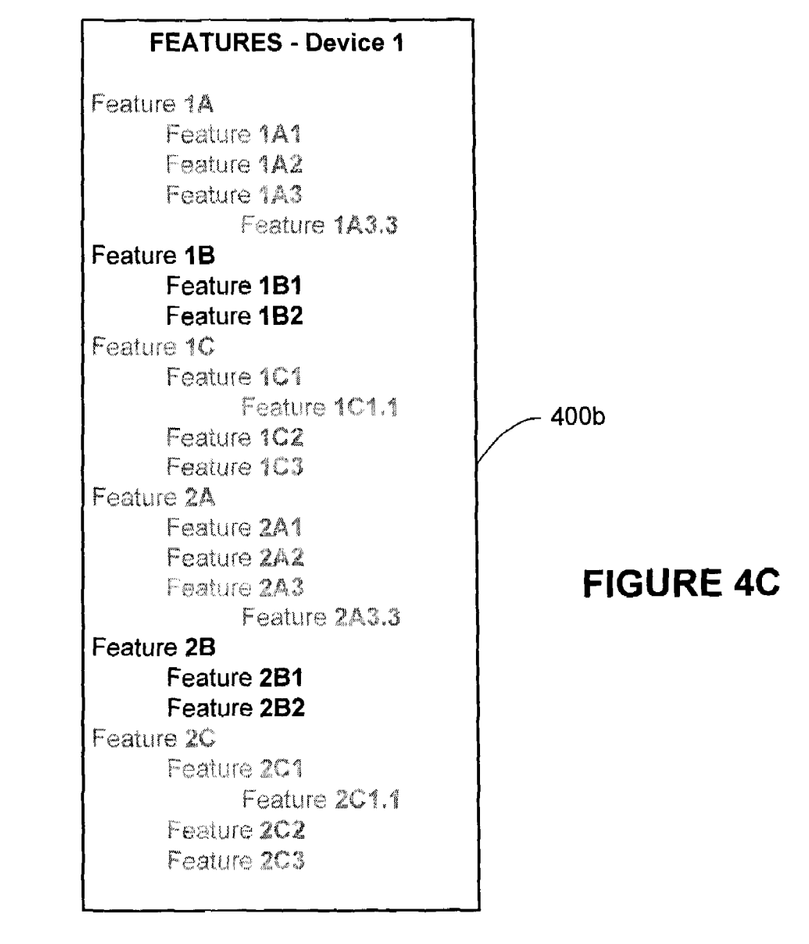

As was also noted above, another shortcoming of conventional systems is that a device is typically only able to display information relating to features provided by that device. In situations where a remote device is in operative communications with such a device, the information presented by a conventional system is incomplete, as features enabled by the operative communications between both devices are illustrated from the point of view of only one device. Accordingly, FIGS. 4A-C are diagrams illustrating exemplary device and system feature configurations in which aspects of various embodiments of the present invention may be incorporated. In FIGS. 4A-C, it will be appreciated that either device 1 or device 2, or both, may be considered to be the remote device.

In FIG. 4A, a list 400a of features provided by device 1 is illustrated. The list 400a of FIG. 4A is similar to list 300a of FIG. 3A, above, except that the prefix "1" is appended to each feature. Thus, for example, feature A of FIG. 3A corresponds to feature 1A of FIG. 4A. The "1" indicates that the feature is provided by "device 1."

Turning now to FIG. 4B, a list 410 of features provided by device 2 is illustrated. Again, the list 410 of FIG. 4B is similar to list 300a of FIG. 3A, above, except that the prefix "2" is appended to each feature. Thus, for example, feature A of FIG. 3A corresponds to feature 2A of FIG. 4B. The "2" indicates that the feature is provided by "device 2." As was the case with feature B in FIGS. 3A-B, above, features 1B and 2B are operations related to operative communications between devices 1 and 2. As noted above, conventional systems and methods would present the lists 400a, 410 of features provided by device 1 and device 2, respectively, to a user regardless of whether device 1 and device 2 were in operative communications with each other. Thus, a user of either device would have to navigate through each list 400a, 410 to find functions that are appropriate to operations with the remote device.

Turning now to FIG. 4C, a list 400b of features displayed by—or made available by—device 1 is illustrated. It will be appreciated that the list 400b corresponds to a situation where device 1 and 2 are in operative communications with each other. In such a situation, the feature 1B (as well as sub-features 1B1-2) of device 1 and the feature 2B (as well as sub-features 2B 1-2) of device 2 are related to operations that take place as a result—or are enabled by—the operative communications between device 1 and 2. It will be appreciated that the list 400b represents the features that are made available on device 1, which include the features of device 2. Thus, like list 300b of FIG. 3B, above, list 400b emphasizes features that are related to the operative communications of device 1 with device 2. In addition, list 400b incorporates all or some of the features of device 2 in its display.

In FIG. 4C, the list 400b includes emphasized features 1B and 2B (as well as all sub-features), and deemphasized features 1A, 1C, 2A and 2C (and all sub-features). It will be appreciated that such features may be emphasized or deemphasized as was discussed above in connection with FIGS. 3A-B. In FIG. 4C, all of the features of both device 1 and 2 are present and either emphasized or deemphasized; however, any combination of features (emphasized or deemphasized) from either device 1 or 2 is equally consistent with an embodiment of the present invention. Such a combination of features may be the result of, for example, a default setting, automatic selection, user preference, history of use/nonuse or the like. As a result, a user of a device according to one embodiment of the present invention may be presented with information pertaining to tailored features of a system formed by both device 1 and device 2, rather than simply with features pertaining only to one of the devices.

Figure 5:
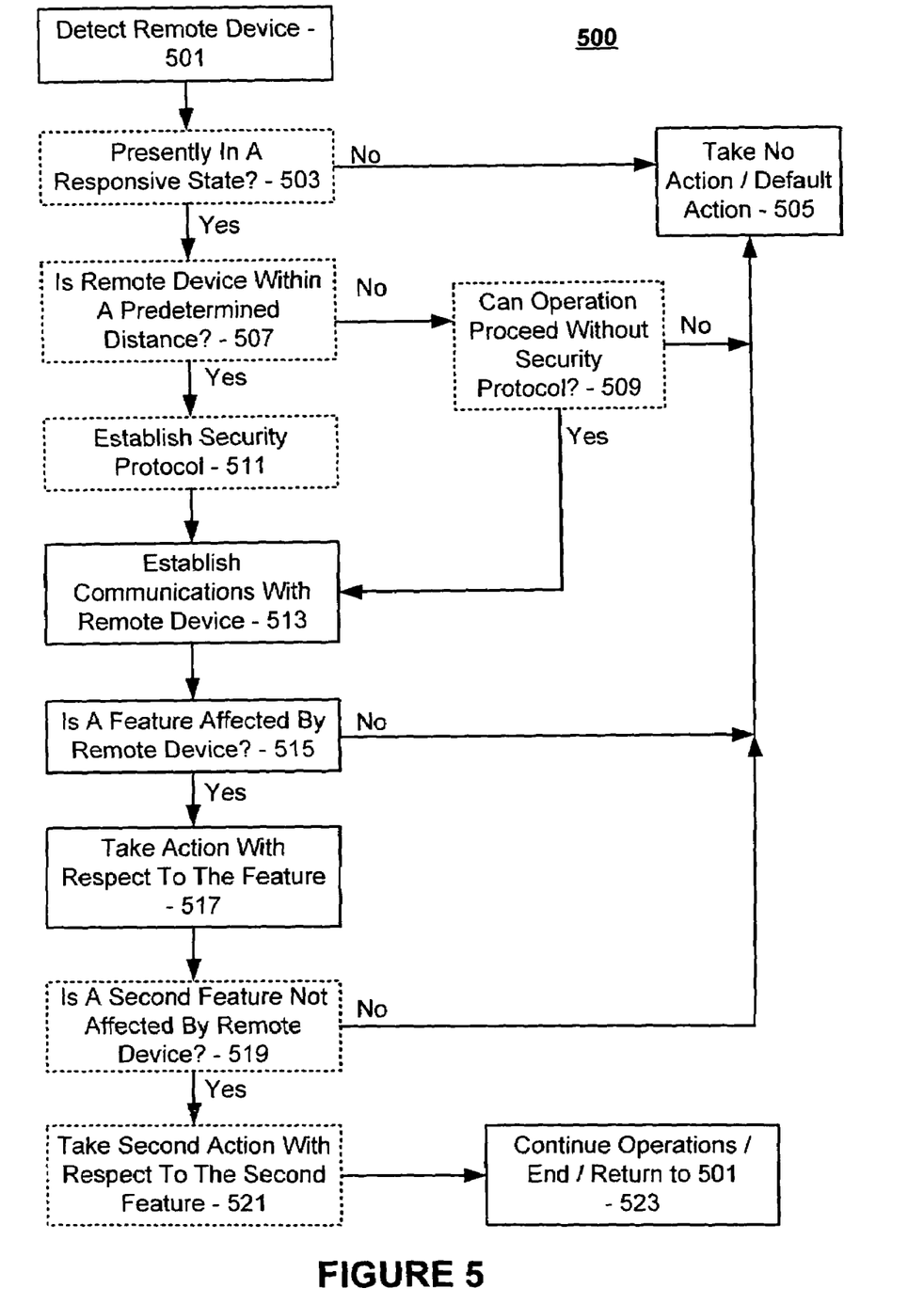
FIG. 5 is a flowchart illustrating a method of modifying the behavior of a device according to an embodiment of the present invention.

Thus, turning now to FIG. 5, a flowchart illustrates a method 500 of modifying the behavior of a device according to the detection of a remote device in accordance with an embodiment. The discussion that follows uses the term "device" to refer to, for example, the computer 200 of FIGS. 2A-C, and "remote device" to refer to, for example, the camera 210 of FIGS. 2A-D. It will be appreciated that any type of device may be the remote device, and thus the above convention is adopted merely for purposes of explanation.

The method 500 begins when a remote device is detected at step 501. Such detection may take place, for example, by way of an RFID tag interrogation, by receiving a wireless transmission from the remote device, or the like. At optional step 503, a determination is made as to whether the device making the determination is in a state that enables a response to the detection of step 501. A variety of factors may affect whether the device is operating in a responsive state. For example, the device making the determination may have, for example, a very low battery and is therefore unable (or will soon become unable) to successfully perform a function with the remote device. In addition, the responsiveness of the device may be affected by the date, time of day, the presence or absence of other devices or objects, and the like.

If, however, the result of the determination of step 503 is that the device is not in a responsive state, the method 500 proceeds to step 505. At step 505, either no action is taken or a default action is taken. For example, in one embodiment the method 500 could simply ignore the detection of the remote device, and continue operating as it was before the detection of step 501. In another embodiment, the method 500 may notify the user of the device of the detection, or of the fact that the device is not in a responsive state. It will be appreciated that any type of action may be taken at step 505 in accordance with an embodiment.

If the determination of step 503 is that the device is in a responsive state, the method 500 may proceed directly to step 513. It will be appreciated that the determination of step 503 may be that the device is responsive in a manner that is modified by any or all of the factors discussed above in connection with the determination of step 503. In such a case, the action taken in step 517, to be discussed below, is modified in a manner consistent with the modified responsiveness of the device.

Any of optional steps 507-511 may be taken to establish a security protocol with the remote device. At optional step 507, a determination is made as to whether the remote device is within a predetermined distance. In some embodiments it may be beneficial to assume that close proximity between devices is sufficient to confer a security clearance between the devices. Thus, if the determination of optional step 507 is that the remote device is within a predetermined distance, the method 500 proceeds to optional step 511, where a security clearance is established. It will be appreciated that such a security protocol may be any type of security arrangement, such as encryption, encoding, security multiplexing and the like. It will also be appreciated that optional step 511 may take place alone, without the intervention of optional steps 507-509. Thus, in some embodiments, the method 500 may automatically establish a security protocol without the determination of optional step 507.

If the determination of optional step 507 is that the remote device is not within a predetermined distance, the method 500 proceeds to step 509. At step 509, another determination is made as to whether the operation may proceed without a security protocol. If the determination is that the operation may proceed without a security protocol, the method 500 proceeds to step 513. As noted above in connection with steps 507 and 511, any, all or none of steps 507-511 may take place in the method 500. If the determination is that the operation may not proceed without a security protocol, the method 500 proceeds to step 505, as was discussed above.

At step 513, operative communications with the remote device are established. As noted above in connection with FIG. 2B, any type or configuration of operative communications may be used in an embodiment of the invention. Any of the above-referenced or other types of wireless communications may be used while remaining consistent with an embodiment.

At step 515, a determination is made as to whether a feature is affected by the establishment of operative communications with the remote device. One example of affecting a feature would be in the above example using a personal computer and a digital camera such as, for example, computer 200 and camera 210 as discussed above in connection with FIGS. 2A-D. In such an example, the computer 200 may determine that a digital picture transfer feature is affected by the establishment of operative communications with the camera 210, because the computer 200 now has a source from which to receive a digital picture. In other words, the transfer feature can now be carried out when it was previously not possible, or can now be carried out using a new or different source of digital pictures because of the establishment of operative communications with the camera 210. As an additional example, the computer 200 may determine that a display feature is affected, as the computer 200 could download pictures from the camera 210 and display them on a monitor or the like.

It will be appreciated that in some embodiments the situation may be reversed. For example, the camera 210 may detect and establish operative communications with the computer 200. In such a case, the camera 210 could determine that a digital image transfer feature is affected by the establishment of operative communications with the computer 200, because the camera 210 has a new and/or additional place to transfer digital pictures. In addition, the method 500 may take place in both devices such as, for example, computer 200 and camera 210, simultaneously as each device detects and establishes operative communications with the other.

If the determination of step 515 is that a feature is not affected by the establishment of operative communications with the remote device, the method 500 proceeds to step 505 as was discussed above. The determination may be that none of the device's features are affected, or that none of a set of enabled features are affected, or the like.

If the determination of step 515 is that a feature is affected by the establishment of operative communications with the remote device, the method 500 proceeds to step 517. At step 517, an action is taken with respect to the feature. As discussed above in connection with FIGS. 3B and 4C, any action may be taken with respect to the affected feature in accordance with an embodiment. For example, using the above computer 200 and digital camera 210 example, the method 500 may automatically initiate a transfer of digital pictures from the camera 210 to the computer 200. In another embodiment, the method 500 may present a transfer option to a user by way of, for example, a user interface. In doing, so an embodiment may navigate through one or more selection menus on behalf of the user based on the affected feature, so as to present actions that are enabled as a result of the affected feature. In the above described examples, the computer 200 could navigate through picture download and/or display menus to present suitable actions to a user. In addition, an embodiment may, as discussed above, emphasize the affected feature on the user interface. It will also be appreciated that the action with respect to the feature may, in an embodiment, cause a device to present a feature of the remote device to a user, as was the case discussed above in connection with FIG. 4C.

At optional step 519, a determination is made as to whether a second feature is not affected by the establishment of operative communications with the remote device. As noted above, a feature that is not affected by the establishment of operative communications with the remote device may be a feature that is unrelated to such a remote device. For example, in the above example using the computer 200 and digital camera 210, an unaffected feature may be a disk drive compression utility, where the utility performs its functions without regard to whether the computer 200 is in operative communications with the digital camera 210 or not. If the result of the determination of optional step 519 is that there is no unaffected feature, the method 500 proceeds to step 505, as was discussed above. As was the case with step 515, the determination may be that no feature, out of all possible features, is unaffected. Similarly, the determination may be that none of a set of features is unaffected, or the like.

If the result of the determination of optional step 519 is that a feature is unaffected, the method 500 proceeds to optional step 521. At optional step 521, a second action is taken with respect to the second feature. For example, an as discussed above in connection with FIGS. 3B and 4C, the second action may be to deemphasize the unaffected feature. For example, the unaffected feature may be minimized in a user interface, hidden from the user, disabled and/or the like. Finally, at step 523, operations are continued or the method returns to step 501 upon detecting a remote device. It will be appreciated that steps 515-517 and optional steps 519-521 may be performed any number of times for any number of features, and the actions taken for each affected or unaffected feature may differ from other affected or unaffected features.

Thus, a device performing the method 500 is able to detect a remote device and establish operative communications with the remote device. As noted above, the designation of the device and remote device is a convention for illustrative purposes only, as any device may be described using either term. In addition, it will be appreciated that any number of devices may perform the method 500 in parallel, as each device detects and establishes operative communications with the other.

It will further be appreciated that the method 500 may be implemented to provide many different types of device behavior and/or functionality based on the detection and establishment of operative communications with a remote device. For example, in one embodiment, a desktop computer may be presenting both a television program and a computer application. At some point, a laptop computer is brought into the same room as the desktop computer. Either or both of the computers may proceed through the method 500 to determine whether a feature is affected by the establishment of operative communications with the other. In the present example, a feature that may be affected is the choice of displays for the television program and the computer application. As a result, in the present example, the desktop computer may switch to only displaying the television program, and the laptop may begin displaying the computer application. In such a manner, the computers can maximize the viewable areas of each operation (television program and computer application). Thus, operations are shared between the two computers.

In another example, a remote control may be brought from a first room into a second room where an electronic device is located. In the second room, the remote control and/or the electronic device proceed through the method 500 to detect and establish operative communications with the other. As a result, in the present example, the remote control can automatically determine the device type of the electronic device, obtain remote control codes from the device (if not already loaded in the remote control) and control the remote device. Thus, in one embodiment, a remote control can determine the type of device the remote control is near, and can then adapt itself to control that device.

In yet another example, a device operating according to the method 500 may be able to provide information on a system formed by several devices that are in operative communications with each other. Referring again to FIG. 2C, for example, the computer 200 may be able to display features relating to both the cellular telephone 220 and the camera 210. For example, the computer 200 may be able to access a calls log from the cellular telephone 220, and may be able to browse a selection of digital pictures stored on the camera 210. Likewise, the cellular telephone 220 may be able to view a personal schedule stored on the computer 200, as well as the selection of digital pictures stored on the camera 210.

As noted above, an embodiment of the present invention is able to "anticipate" a user's next move with respect to devices that are in operative communications with each other. In a further example, therefore, a cellular telephone could be brought into a house, and a user's personal computer or other computing device could detect the telephone and adjust the user's telephone service accordingly. For example, if the user utilizes Voice Over IP (VoIP) technology, the personal computer could control the call routing to effectuate different routing patterns based on whether or not the cellular telephone is in the house. The user could have any number of such routing patterns. When the cellular telephone is in the user's house, the personal computer could route all calls (to the home telephone and cellular telephone) to the home telephone. When the cellular telephone leaves the house, the situation could be reversed, and calls to both the home and cellular telephone are routed to the cellular telephone. As a result, the user would save on cellular minutes, and would be spared the inconvenience of having to answer multiple telephones while at home, missing calls to the cellular telephone and the like.

As yet another example of device behavior enabled by an embodiment of the present invention, a device or system that is operating according to an embodiment could sense when a remote device is brought into proximity and then could recognize or query the device automatically. As a result, the device or system could install necessary drivers and establish communications, if applicable, without user intervention. To a user, new devices appear to just work seamlessly with their system.

Thus, a method and system for modifying the behavior of an electronic device based on the presence of a remote device has been provided. While the present invention has been described in connection with the exemplary embodiments of the various figures, it is to be understood that other similar embodiments may be used or modifications and additions may be made to the described embodiment for performing the same function of the present invention without deviating therefrom. For example, one skilled in the art will recognize that the present invention as described in the present application may apply to any type, number or configuration of electronic devices in any type of environment. Therefore, the present invention should not be limited to any single embodiment, but rather should be construed in breadth and scope in accordance with the appended claims.

What is claimed:

1. A method for modifying an operation of a first processor-operated computing device responsive to a detection of a second processor-operated computing device, comprising the first device:

detecting the second device being in inter-operative wireless communications range with the first device;

establishing inter-operative wireless communications with the second device responsive to said detection of the second device;

identifying the second device by way of wireless communications between the first device and the second device;

identifying, selecting, and actuating a feature of the first device relating to the identified second device;

displaying the actuated feature to a user using the first device by way of an associated display;

receiving a selection of the displayed feature from the user using the first device by way of an associated input device; and performing an operation with regard to the identified second device, the performed operation corresponding to the selection and the displayed feature.

2. The method of claim 1, further comprising determining a present operational state of the first device, and wherein said initiation of the action is in accordance with the present operational state.

3. The method of claim 2, wherein the present operational state of the first device is affected by a battery power level of the first device.

4. The method of claim 1, wherein said detecting step comprises identifying a device type of the second device.

5. The method of claim 4, wherein the feature of the first device is specific to the device type of the second device.

6. The method of claim 1, wherein said detecting step comprises receiving a wireless transmission from the second device.

7. The method of claim 1, wherein said detecting step comprises wirelessly interrogating the second device.

8. The method of claim 1, wherein establishing communications further comprises determining that the second device is within a predetermined distance from the first device, and establishing a security protocol between the first and second devices in response to said distance determination.

9. The method of claim 1, wherein the feature of the first device is affected by said establishment of communications with the second device if an implementation of the feature requires the second device.

10. The method of claim 1, wherein the feature of the first device is a first feature, and further comprising determining that a second feature of the first device is not affected by said establishment of communications with the second device, and initiating a second action with respect to the second feature.

11. The method of claim 10, wherein the second action is disabling the second feature.

12. The method of claim 10, wherein the second action is removing the second feature from a presentation of information to a user.

13. The method of claim 1 further comprising the first device:
detecting the identified second device having moved out of inter-operative wireless communications range with the first device;
de-actuating the feature of the first device relating to the out-of-range second device; and
removing from the display the de-actuated feature, whereby the user can no longer select the de-actuated feature.

14. A processor-operated computing device capable of modifying its behavior based on a detection of a processor-operated computing remote device, the device comprising:
a memory, wherein said memory stores a plurality of features;
a wireless interface, wherein said wireless interface detects the remote device being in inter-operative wireless communications range with the first device and establishes inter-operative wireless communications with the remote device; and
a processor, wherein said processor:
identifies the remote device by way of wireless communications between the device and the remote device;
identifies, selects, and actuates a feature of the device relating to the identified remote device;
displays the actuated feature to a user using the device by way of an associated display;
receives a selection of the displayed feature from the user using the device by way of an associated input device; and
performs an operation with regard to the identified remote device, the performed operation corresponding to the selection and the displayed feature.

15. The device of claim 14, wherein said wireless interface detects a RFID tag associated with the remote device.

16. The device of claim 14, further comprising a user interface for presenting information to a user.

17. The device of claim 16, wherein the action initiated by the processor is the presentation of information relating to the one of the plurality of features on the user interface.

18. The device of claim 14, wherein the processor further initiates the action by enabling the one of the plurality of features.

19. The device of claim 14, wherein the processor further determines whether the remote device is within a predetermined distance, and establishing a security protocol with the remote device in response to the distance determination.

20. The device of claim 14, wherein the processor further determines that a second one of the plurality of features is not affected by said establishment of communications with the remote device, and initiates a second action with respect to the second one of the plurality of features.

21. The device of claim 14 wherein the processor further:
detects the identified remote device having moved out of inter-operative wireless communications range with the device;
de-actuates the feature of the device relating to the out-of-range remote device; and
removes from the display the de-actuated feature, whereby the user can no longer select the de-actuated feature.

22. A computer-readable medium having computer-readable instructions for performing a method for modifying an operation of a first processor-operated computing device responsive to a detection of a second processor-operated computing device, the method comprising the first device:
detecting the second device being in inter-operative wireless communications range with the first device;
establishing inter-operative wireless communications with the second device responsive to said detection of the second device;
identifying the second device by way of wireless communications between the first device and the second device;
identifying, selecting, and actuating a feature of the first device relating to the identified second device;
displaying the actuated feature to a user using the first device by way of an associated display;
receiving a selection of the displayed feature from the user using the first device by way of an associated input device; and
performing an operation with regard to the identified second device, the performed operation corresponding to the selection and the displayed feature.

23. The computer-readable medium of claim 22, wherein the method further comprises determining a present operational state of the first device, and wherein said initiation of the action is in accordance with the present operational state.

24. The computer-readable medium of claim 23, wherein the present operational state of the first device is affected by a battery power level of the first device.

25. The computer-readable medium of claim 22, wherein said detecting step comprises receiving a wireless transmission from the second device.

26. The computer-readable medium of claim 22, wherein said detecting step comprises wirelessly interrogating the second device.

27. The computer-readable medium of claim 22, wherein establishing communications further comprises determining that the second device is within a predetermined distance from the first device, and establishing a security protocol between the first and second devices in response to said distance determination.

28. The computer-readable medium of claim 22, wherein the feature of the first device is affected by said establishment of communications with the second device if an implementation of the feature requires the second device.

29. The computer-readable medium of claim 22, wherein said initiating step comprises enabling the feature of the first device.

30. The computer-readable medium of claim 22, wherein said initiating step comprises providing the feature without user intervention.

31. The computer-readable medium of claim 22, wherein the feature of the first device is a first feature, and further comprising determining that a second feature of the first device is not affected by said establishment of communications with the second device, and initiating a second action with respect to the second feature.

32. The computer-readable medium of claim 31, wherein the second action is disabling the second feature.

33. The computer-readable medium of claim 31, wherein the second action is removing the second feature from a presentation of information to a user.

34. The computer-readable medium of claim 22, wherein said initiating step comprises presenting the feature of the first device to a user of the first device.

35. The medium of claim 22 wherein the method further comprises the first device:
   detecting the identified second device having moved out of inter-operative wireless communications range with the first device;
   de-actuating the feature of the first device relating to the out-of range second device; and
   removing from the display the de-actuated feature, whereby the user can no longer select the de-actuated feature.

* * * * *